United States Patent [19]
Resch

[11] Patent Number: 5,496,099
[45] Date of Patent: Mar. 5, 1996

[54] VEHICLE HYDRAULIC DUAL-CIRCUIT BRAKE SYSTEM

[75] Inventor: Reinhard Resch, Stuttgart, Germany

[73] Assignee: Mercedes-Benz AG, Germany

[21] Appl. No.: 434,805

[22] Filed: May 4, 1995

[30] Foreign Application Priority Data

May 4, 1994 [DE] Germany .......................... 44 15 613.8

[51] Int. Cl.$^6$ ................................ B60T 8/26; B60T 8/60
[52] U.S. Cl. ...................... 303/114.1; 303/113.4
[58] Field of Search .................... 303/139, 113.2, 303/113.4, 115.1, 115.2, 116.1, 116.2, DIG. 1–4, 114.1

[56] References Cited

FOREIGN PATENT DOCUMENTS

| | | |
|---|---|---|
| 4208496C1 | 8/1993 | Germany . |
| 4329139C1 | 7/1994 | Germany . |
| 2169370 | 7/1986 | United Kingdom . |
| 2241294 | 8/1991 | United Kingdom . |

*Primary Examiner*—Josie Ballato
*Attorney, Agent, or Firm*—Evenson, McKeown, Edwards & Lenahan

[57] ABSTRACT

A hydraulic dual-circuit brake system for a road vehicle, with front-axle/rear-axle brake-circuit division, is equipped with an anti-lock system working on the recirculation principle, a device for driving-dynamics control and a device for the automatic initiation of full braking when the driver actuates the brake pedal at a speed $\phi$ which is higher than a relevant threshold value $\phi_s$. A pedal-position sensor and a pressure sensor which generates electrical output signals characteristic of the brake pressure fed into the front-axle brake circuit provide control of the brake-pressure control unit into the brake-pressure supply mode both by the pedal-controlled pressure loading of a drive-pressure space of its brake booster and by the valve-controlled pressure loading of the drive-pressure space of the brake booster. The valve-controlled pressure loading is capable of being initiated automatically by output signals from an electronic control unit. For a supplementary or sole supply of brake pressure to the front-axle brake circuit, an auxiliary cylinder can, by valve control, be loaded with and relieved again of the outlet pressure of an auxiliary-pressure source and is a pressure intensifier. Thereby, brake fluid can be displaced into the front-axle brake circuit both during normal braking and during automatically controlled braking. The brake-fluid quantity can be controlled in a predeterminable monotonic correlation from a comparative processing of the output signals of the pedal-position sensor with the output signals of the pressure sensor.

18 Claims, 4 Drawing Sheets

VEHICLE HYDRAULIC DUAL-CIRCUIT BRAKE SYSTEM

CROSS REFERENCE TO RELATED APPLICATION

This application is related to an application entitled BRAKE-PRESSURE CONTROL DEVICE HAVING REAR-AXLE BRAKE CIRCUIT SELF-PRIMING RECIRCULATION PUMP filed in the name of Reinhard RESCH, on even date herewith, under Ser. No. 08/434,800. The subject matter of that application, including the background discussion, is incorporated herein by reference.

BACKGROUND AND SUMMARY OF THE INVENTION

The present invention relates to a hydraulic dual-circuit brake system for a road vehicle equipped with an anti-lock system which works on the recirculation principle and with a device for driving-dynamics control which works on the principle of keeping the longitudinal and the lateral slip of the vehicle wheels within limits compatible, as a whole, with the dynamic stability of the vehicle by way of an automatic electronically controlled activation of one or more wheel brakes.

More particularly, the present invention involves a system with a device for the automatic initiation of full braking, which device works on the principle of activating the master cylinder of the brake system with a high actuating force by triggering the brake booster of the brake system, when the driver actuates the brake pedal at a speed ($\phi$) which is higher than a threshold value ($\phi_s$).

DE 4,208,496 A1 discloses one type of known brake system. In, for example, a known brake system which has a front-axle/rear-axle brake-circuit division, a tandem master cylinder actuable by pedal control by a pneumatic brake booster and having pressure outlets assigned individually to the brake circuits is provided as a brake-pressure control unit. The front-axle brake circuit I is connected to the primary outlet-pressure space of the tandem master cylinder which is limited movably on one side by the plunger-rod piston, and the rear-axle brake circuit II is connected to the secondary outlet-pressure space of the tandem master cylinder which is limited movably on one side by the floating piston of the tandem master cylinder. A pedal-position sensor generates electrical output signals which are characteristic of the particular instantaneous position of the brake pedal.

From the conventional processing of these output signals as desired-value signals, an electronic control unit provided for controlling the particular control mode (anti-lock control or driving-dynamics control) also recognizes the need for automatic full braking and initiates this full braking when the threshold value ($\phi_s$) of the pedal-actuating speed is exceeded.

Furthermore, a pressure sensor issues output signals characteristic of the instantaneous value of the brake pressure generated during normal braking controlled by the driver, which signals are received as actual-value signals by the electronic control unit and are compared with the desired-value signals. Consequently, by utilizing the brake-pressure regulating valves of the anti-lock system, a desired-value-guided follow-up regulation of the brake pressure with the effect of a requisite brake-force distribution is achieved.

The selection of the wheel brake or wheel brakes to be activated in the driving-dynamics control mode and loadable with the pressure generatable as a result of the automatic activation of the brake booster or of the brake-pressure control unit takes place in that the inlet valves of the wheel brakes not to be loaded with brake pressure are switched into their shut-off position, and the inlet valve or inlet valves of that wheel brake or of those wheel brakes to be activated in the driving-dynamics control mode remains or remain held in the open position.

In the conventional brake system which, even in the event of a failure of the anti-lock system, allows a dynamically stable deceleration behavior of the vehicle, the critical vehicle deceleration ($Z_{crit}$), which, according to the constructively predetermined installed front-axle/rear-axle brake-force distribution, corresponds to an equal adhesion utilization on the front wheels and the rear wheels when braking takes place on a dry non-skidding road, cannot be achieved without the cooperation of the driver in the generation of the actuating force acting on the plunger-rod piston of the tandem master cylinder, that is not already at the cut-off point of the brake booster. Therebeyond, the brake booster no longer contributes anything to the actuating force acting on the plunger-rod piston of the tandem master cylinder, and therefore a further increase in the brake force is possible solely by the driver exerted actuating force.

In practice, therefore, purely by cutting off the brake booster, only approximately 75% of that actuating force necessary to generate a maximum useful brake force can be exerted on the plunger-rod piston of the brake-pressure control unit. For the driving-dynamics control mode, this is disadvantageous inasmuch as the brake forces which can be generated purely by cutting off the brake booster are relatively far below the maximum brake forces which can be generated in the normal braking mode.

In a further brake system which is the subject of a previously unpublished Patent Application P 43 29 139.2, the foregoing disadvantage is avoided by utilizing, in the driving-dynamics control mode, the recirculating pumps of the two brake circuits as brake-pressure sources which, in as conventional piston pumps, are capable, in principle, of supplying very high outlet pressures. These outlet pressures are limited by pressure-limiting valves to values which are still sufficiently high to ensure that, even in the driving-dynamics control mode, the blocking limit can be reached on the individual wheel brakes and an optimum adhesion utilization of the individual braked vehicle wheels can be achieved by utilizing the anti-lock control functions. Brake fluid at a moderate pressure level of approximately 15 bar is delivered to the recirculating pumps on the inlet side by a precharging pump.

For the hydraulic separation of the two brake circuits, there are provided precharging cylinders which are each assigned individually thereto and which each have a piston which delimits in a pressure-tight manner an outlet-pressure space which can be connected, via an electrically triggerable precharging control valve, to the low-pressure connection of the recirculating pump of the respective brake circuit, relative to a drive-pressure space, to which the pressure outlet of the precharging pump is connected. This piston has two flanges which are arranged at an axial distance from one another and between which extends a follow-up space kept in constantly communicating connection with either one of the pressure outlets of the brake unit.

The piston of the respective precharging cylinder is provided with a mechanically actuable valve also performing the function of a non-return valve which shuts off a piston throughflow duct connecting the follow-up space to the outlet-pressure space, as long as the pressure in the outlet-pressure space of the respective precharging cylinder is higher than in the follow-up space, and which opens this throughflow path when the master-cylinder outlet pressure fed into the follow-up space is higher than the pressure in the outlet-pressure space of the precharging cylinder.

An electrically triggerable change-over valve is inserted in each case between the pressure outlet of the respective precharging cylinder and the main brake conduit of the brake circuit supplied with pressure thereby, and is opened when currentless and shuts off when in the energized state assigned to the DDC mode. The low-pressure inlets of the two recirculating pumps are connected to the main brake conduit of the respective brake circuit, each via a non-return valve which, as a result of a relatively higher pressure in the return conduit of the respective brake circuit than at the low-pressure inlet of its recirculating pump, is loaded in the opening direction and which otherwise shuts off. The two precharging cylinders have a common drive-pressure space which is connected to the pressure outlet of the precharging pump and which can be shut off relative to the brake-fluid reservoir of the brake system by triggering a currentlessly open solenoid valve.

The considerable technical outlay and space requirement which is necessitated by the two precharging cylinders and to which the precharging pump required additionally contributes must be considered as a substantial disadvantage of the brake-pressure control device according to aforementioned Patent Application P 43 29 139.2.

That brake system has a substantially more complicated construction and is also correspondingly more expensive in comparison with a vehicle equipped with a conventional anti-lock and traction control system which allows an automatic activation of only the wheel brakes of the driven vehicle wheels. On account of the additional precharging cylinders in a brake system thus far explained, there are also additional chambers, out of which gas bubbles, which can form in the case of a high thermal load on the wheel brakes, can escape only with difficulty. This is true particularly when the two precharging cylinders are combined to form a "symmetrical" constructional unit and therefore the arrangement of the two precharging cylinders which is most favorable for a passably good bleedability of these can be adopted at most with a view to the best possible compromise.

An object of the present invention is, therefore, to improve a brake system so as, regardless of the possibility of having the capacity to utilize high brake forces both in the normal braking mode and in the driving-dynamics control mode, to have a simpler construction and also to be less susceptible to faults.

This object has been achieved according to the present invention, by a system in which the brake-pressure control unit is configured to be controllable into a brake-pressure supply mode both by pedal-controlled pressure loading of a drive-pressure space of the associated brake booster and by valve-controlled pressure loading of tile drive-pressure space of the brake booster. The valve-controlled pressure loading is initiatable automatically by output signals from the electronic control unit. An auxiliary cylinder is provided for one of a supplementary and sole supply of brake pressure to the front-axle brake circuit of the brake system so as, by way of valve control, selectively loadable with and relieved of outlet pressure of an auxiliary pressure source and via which, both during normal driver-controlled partial or full braking and during automatically controlled partial or full braking, a brake quantity fluid is displaceable into the brake circuit connected to the primary pressure outlet of the brake-pressure control unit. The auxiliary cylinder constitutes a pressure intensifier whose maximum outlet-pressure level is sufficiently high for utilization of high adhesion coefficients in the driving-dynamics control mode. The brake-fluid quantity displaceable into the front-axle brake circuit is controllable in a predeterminable monotonic correlation from a comparative processing of output signals of the pedal-position sensor with output signals of the pressure sensor.

Accordingly, the brake-pressure control unit can be controlled in the brake-pressure supply mode both by the pedal-controlled pressure loading of a drive-pressure space of its brake booster and by the valve-controlled pressure loading, triggerable automatically by output signals from the electronic control unit, of the drive-pressure space of the brake booster. Only the rear-axle brake circuit is supplied with brake pressure solely by the brake-pressure control unit.

For a supplementary or sole supply of brake pressure to the front-axle brake circuit, an auxiliary cylinder can, by valve control, be loaded with and relieved again of the outlet pressure of a hydraulic pressure source present in any case on the vehicle, for example the supply pump of a power-assisted steering or a level control of the vehicle. Thereby, both during normal part or full braking controlled by the driver and during automatically initiated and controlled part or full braking, brake fluid can be displaced into the front-axle brake circuit which is connected to the primary pressure outlet of the brake-pressure control unit and which has the larger volumetric capacity.

This auxiliary cylinder is configured in the manner of a pressure intensifier. The maximum outlet-pressure level thereof utilizes high adhesion coefficients in the driving-dynamics control mode, that is to say can supply an outlet pressure. By way thereof, even during braked driving on a bend in which the highest wheel load occurs on the front wheel located on the outside of the bend, the latter can be braked up to the locking limit, so that the anti-lock control responds on this vehicle wheel. Provision is further made for the brake-fluid quantity displaceable into the front-axle brake circuit by the auxiliary cylinder to be controllable by a comparative processing of the output signals from the pedal-position sensor with the output signals from the pressure sensor in a predeterminable monotonic correlation with the output signals from the pedal-position sensor. As a result, the pedal-travel/brake-pressure characteristic of the brake system can be varied within relatively wide limits purely by electronic control. That is, in a brake system with a predetermined mechanical dimensioning of the brake-pressure control unit and of the wheel brakes, a desired pedal-travel/brake-pressure characteristic can be predetermined.

Presupposing a specific dimensioning of the brake-pressure control unit and of the auxiliary cylinder, brake systems can, with these control elements, for vehicles of differing weight and/or differing power be produced, inasmuch as there is the guarantee that it is possible to displace into the rear-axle brake circuit solely from the brake-pressure control unit a brake-fluid quantity which is sufficient to generate the maximum useful brake pressure in the rear-axle brake circuit. The brake-fluid volume sufficient for generating the maximum useful brake pressures in the front-axle brake circuit can be provided by the auxiliary cylinder in combination with the brake-pressure control unit.

In addition, the brake-pressure control unit can be operated, in relation to the maximum brake pressure to be built up, with a relatively "small", low-rated, brake booster. Thus, for example, in instances in which, with the conventional design of the brake system, a pneumatic brake booster would be necessary in a tandem form of construction, a single-stage pneumatic brake booster can be sufficient. For example, so that the same brake-pressure control unit can be used in each case within a production series of vehicles, the vehicle types of which differ merely in being equipped with engines of different power, it will be sufficient if the auxiliary cylinder can feed into the front-axle brake circuit between 30% and 70% of that brake-fluid quantity which has to be displaceable into the latter in order to make it possible to generate in the front-wheel brakes the brake pressure necessary for reaching the locking limit of the braked wheels.

In such a configuration of the brake system, if the brake booster fails, virtually the maximum possible vehicle deceleration can still always be achieved, as long as the auxiliary cylinder is operative. If the auxiliary cylinder fails, approximately two-thirds (⅔) of the maximum possible brake force can still be generated. If one of the two brake circuits fails, the other brake circuit remains operative, a failure of the front-axle brake circuit leading to a smaller idle travel of the brake pedal than in a conventional brake system.

This applies particularly to the configuration of the brake-pressure control unit and of the auxiliary cylinder of the brake system according to the present invention, in which, if the front-axle brake circuit fails, only a small idle travel of the brake pedal occurs until the brake system responds.

The brake system of the present invention allows the driving-dynamics control to be implemented by the use of the hydraulic unit of a standard four-channel anti-lock system. Only the electronic control unit has to be designed (programmed) for the additional control function.

An implementation of the driving-dynamics control function in the brake system according to the present invention utilizes as a pressure source for the rear wheel brakes which, in the driving-dynamics control mode and also in the anti-lock control mode assuming that the vehicle has a rear-axle drive, the recirculating pump of the rear-axle brake circuit which, at its low-pressure inlet, is loaded with the outlet pressure suppliable by the secondary outlet of the brake-pressure control unit which to that extent is operated as a precharging-pressure source. The brake-fluid delivery to the recirculating pump takes place via a supply control valve. The main brake conduit of the rear-axle brake circuit is shut off relative to the secondary pressure outlet of the brake-pressure control unit by a change-over valve. This has the advantage that the brake pressure, which can be fed into the rear-wheel brakes and by means of which the output-torque fraction of the vehicle engine, effective on the respective driven vehicle wheel, also still has to be compensated or "braked away" can, if necessary, be increased well beyond the brake pressure which would be achievable solely by the automatic activation of the brake-pressure control unit.

For as rapid a brake-pressure build-up as possible in the wheel brake or wheel brakes to be activated of the rear-axle brake circuit, it is advantageous at the same time if a non-return valve is connected parallel to the change-over valve and, as a result of a higher pressure at the secondary-pressure outlet of the brake master cylinder than in the main brake conduit of the rear-axle brake circuit, is loaded in the opening direction and otherwise shuts off. Thus, the particular higher pressure prevailing at the outlet of the brake master cylinder or generated by the recirculating pump is fed into the main brake conduit of the rear-axle brake circuit, which, at the start of the brake-pressure build-up, will usually be the outlet pressure of the brake-pressure control unit. Such a non-return valve also ensures that braking can still take place in the event of a malfunction of the change-over valve, for example retention in each shut-off position.

In order reliably to avoid an excessive generation of pressure in the rear-axle brake circuit, it is advantageous if the change-over valve which, in its switching position, shuts off the main brake conduit of the rear-axle brake circuit relative to the secondary-pressure outlet of the brake-pressure control unit, performs the function of a pressure-limiting valve in this switching position, or if there is connected parallel to the change-over valve a pressure-limiting valve, by way of which the rear-axle brake pressure is limited to a sufficiently low value of, for example, 170 bar.

In the brake system of the present invention, a pressure reduction in the course of automatically controlled braking is also possible in that, via the pressure-limiting valve, the recirculating pump conveys brake fluid back into the master cylinder (the brake-pressure control unit) while at the same time the precharging control valve of the rear-axle brake circuit is held in its basic shut-off position, whether as a result of a malfunction or intentionally. This utilization of the recirculating pump for pressure reduction is intended preferably for the emergency situation in which the change-over valve is caught in its shut-off position and the precharging control valve falls back into its basic shutoff position as a result of a malfunction. This malfunction can be recognized by the electronic control unit and the fact that there is a marked wheel slip on at least one of the rear wheels, although a signal combination which would be characteristic of a situation requiring control is not given.

If the brake pressure in the rear-axle brake circuit is adjustable, as it were, independently of the pressure which can be fed into the front-axle brake circuit, a pressure sensor can advantageously monitor the pressure in the main brake conduit of the rear-axle brake circuit and delivers its electrical output signals to the electronic control unit as information input signals which can then be utilized, both during normal braking and during automatically controlled braking, to control a situation-specific-brake-pressure/time curve.

A brake-pressure generation in the front-axle brake circuit, which is strictly correlated to the output pressure of the brake-pressure control unit, but, in principle, can be controlled as desired, and which can be advantageous for an electronically controlled brake-force distribution control, is made possible in a simple way by providing an outlet control valve constituting a solenoid valve and configured to be changeable over from a basic position, in which the primary pressure outlet of the master cylinder is connected to the pressure-supply connection of the main brake conduit of the front-axle brake circuit, into a shut-off position.

It is also advantageous, at least in combination therewith, if the recirculating pump of the rear-axle brake circuit is a so-called self-priming pump which, in the event of a need for traction control or driving-dynamics control, allows activation of at least one of the rear-wheel brakes of the vehicle, even when the brake-pressure control unit is not triggered.

As a result of the configuration of the auxiliary cylinder in accordance with the present invention as described in detail below, a reliable media separation is achieved in the event that the auxiliary-pressure source, with the outlet pressure of which the drive stage of the auxiliary cylinder can be loaded, is operated with a hydraulic oil, for example a conventional mineral oil which should not be mixed with brake fluid if packing damage to the piston packings of the displacement piston and/or of the drive piston of the auxiliary cylinder is to be reliably avoided.

The configuration of the drive-piston stage and of the displacement-piston stage of the auxiliary cylinder as separate piston elements has the additional advantage that production tolerances of the auxiliary cylinder housing, i.e., slight eccentricities of the bore stages in which the piston elements are displaceable in a pressure-tight manner, can be compensated in a simple manner. The same advantage applies if the housing of the auxiliary cylinder is of multi-part configuration and its piston elements are arranged in different housing parts. Such a multi-part configuration of the auxiliary cylinder can be expedient so that a displacement part of the auxiliary cylinder can be coupled to differently dimensioned drive parts, in order thereby to achieve an adaptation to the respective outlet-pressure level of various auxiliary-pressure sources.

BRIEF DESCRIPTION OF THE DRAWINGS

These and further objects, features and advantages of the present invention will become more readily apparent from the following detailed description thereof when taken in conjunction with the accompanying drawings wherein.

DETAILED DESCRIPTION OF THE DRAWINGS

Figure 1:
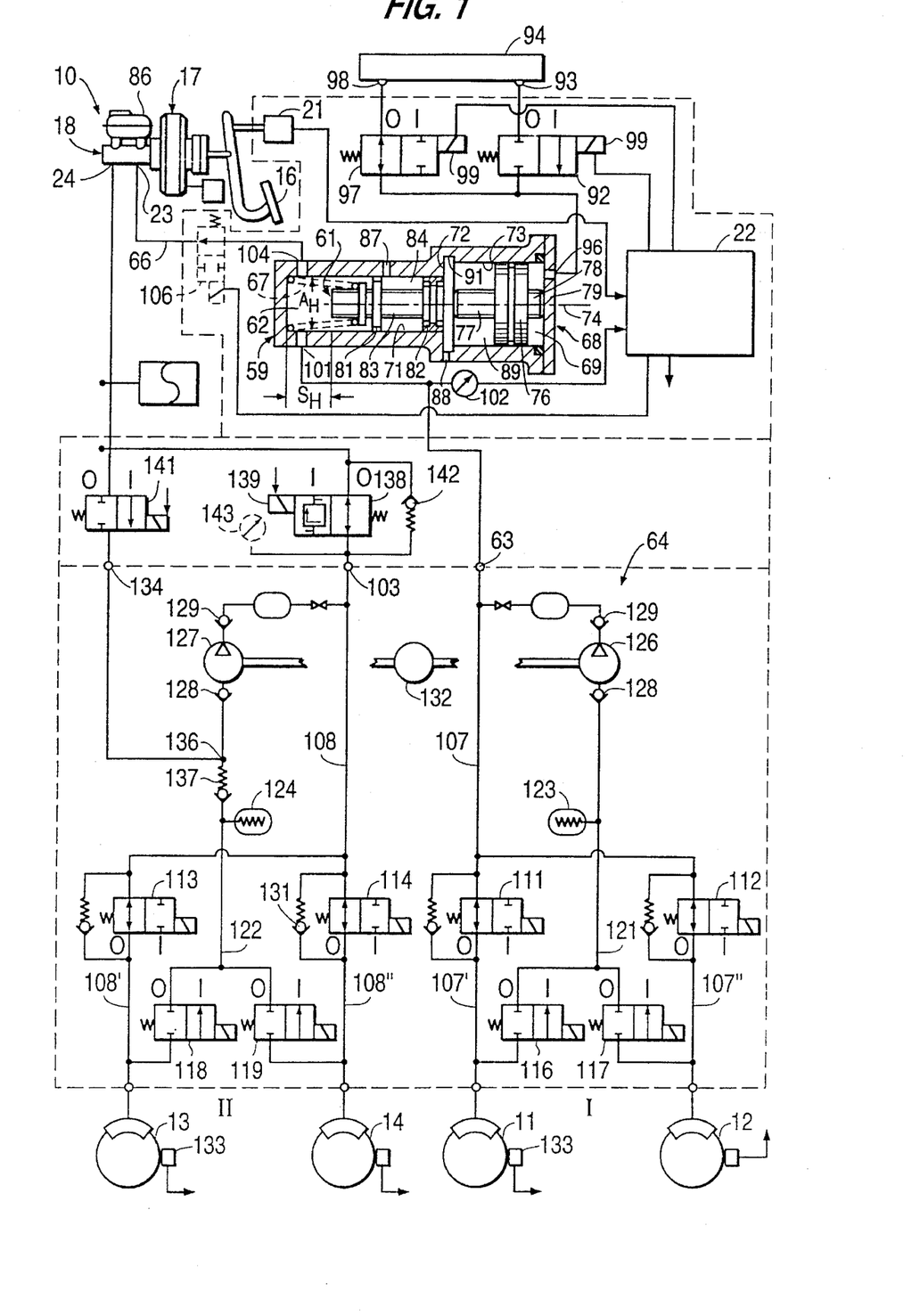
FIG. 1 is an electrohydraulic circuit schematic diagram of a first embodiment of a dual-circuit brake system according to the present invention in which a brake-pressure control unit is activatable automatically by valve control.

The dual-circuit brake system designated generally by numeral 10 in FIG. 1 is used in a road vehicle equipped with an anti-lock system (ABS) working on the recirculation principle and with a device for driving-dynamics control (DDC) which works on the principle of keeping the longitudinal and the lateral slip of the vehicle wheels during the operation of the vehicle always within values compatible, as a whole, with the dynamic stability of the vehicle by way of an automatically electronically controlled activation of one or more of the wheel brakes 11 to 14. The DDC also performs the function of traction control (ASR) by the automatic activation of one or both wheel brakes 13 and/or 14 of the vehicle, on the assumption that the latter has a rear-axle drive.

It is further assumed that the vehicle is also equipped with a device for the automatic initiation of full braking, i.e. brake-assistance (BA) function, which is initiated when the driver actuates the brake pedal 16 of the brake-pressure control unit having a brake booster 17 and of a tandem master cylinder 18 actuable thereby, in the introductory phase of a braking operation at a speed $\dot\phi$ which is higher than a threshold value $\dot\phi_s$.

To record or sense the speed $\dot\phi$, at which the driver actuates ("depresses") the brake pedal 16, there is provided an electronic or electromechanical pedal-position sensor 21 which delivers its output signals characteristic of the particular instantaneous position of the brake pedal 16 to an electronic control unit 22 which, from a time-differentiating processing of the output signals from the pedal-position sensor 21, "recognizes" the speed $\dot\phi$ at which the driver actuates the brake pedal 16.

To explain this electronic control unit 22, which also performs the control of brake-pressure change phases of the anti-lock (ABS), driving-dynamics (DDC) and traction control (ASR), it is considered sufficient to explain its functions, from a knowledge of which an average person skilled in the art of electronic circuitry and control engineering is capable of producing an operative electronic control unit 22.

Figure 1A:
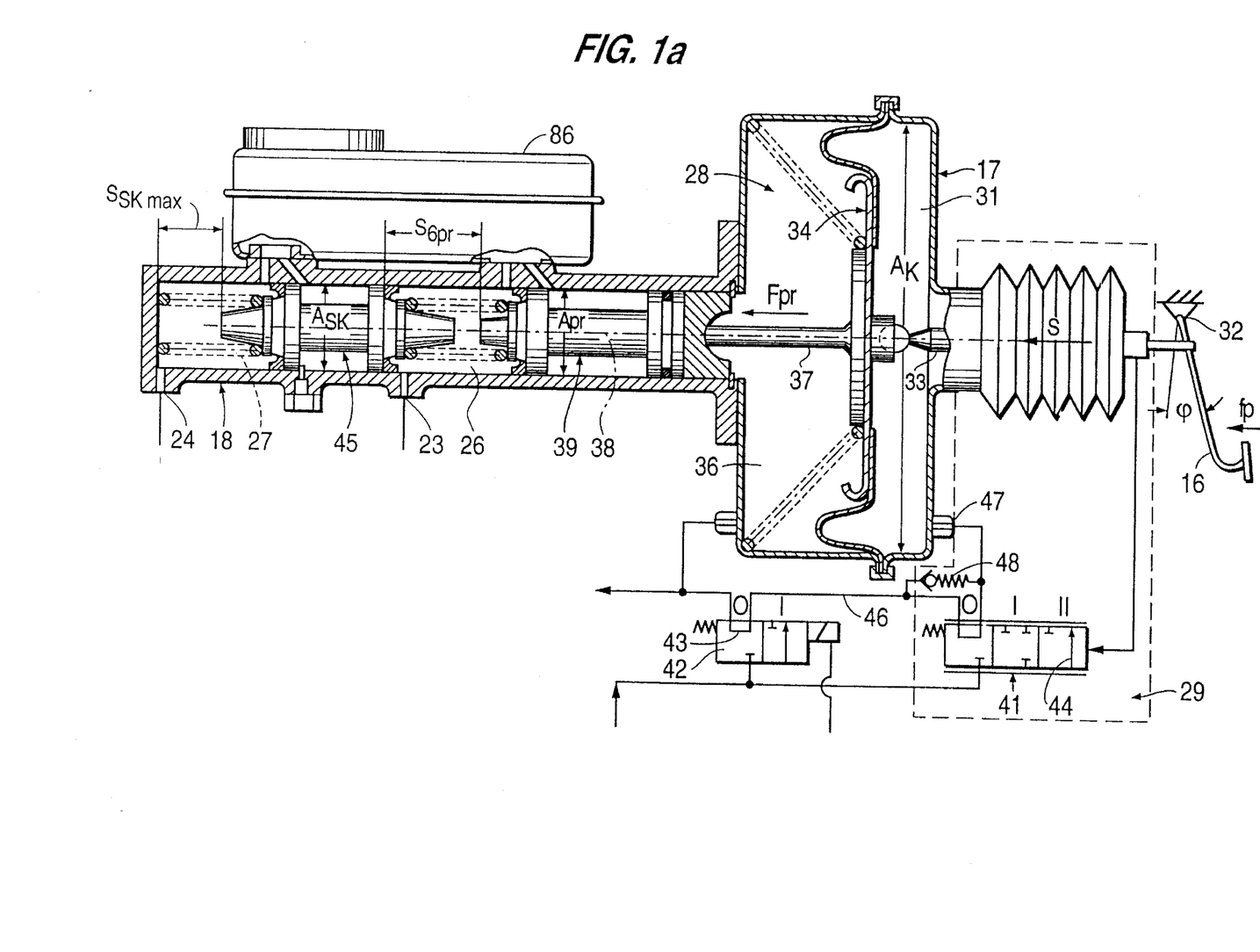
FIG. 1a is a side, partially cross-sectional view of the brake-pressure control unit of the brake system according to FIG. 1.

The brake system 10 has a conventional front-axle/rear-axle brake-circuit division, the two brake circuits I and II being closed or static brake circuits which are each connected to one of the two pressure outlets 23, 24 of the tandem master cylinder 18, for an explanation of which reference may also additionally be made to FIG. 1a. The pressure built up in the primary outlet-pressure space 26 and in the secondary outlet-pressure space 27 of the tandem master cylinder 18 is provided at the pressure outlets 23, 24 when the brake-pressure control unit 17, 18 is actuated.

In the embodiment of FIGS. 1 and 1a, the brake booster 17 is a pneumatic booster which consists of a pneumatic drive cylinder 28 and of a control part designated generally by numeral 29, which can be actuated by the brake pedal 16. As a result of the actuation of the brake pedal 16, a pressure $P_A$ can be fed into a drive-pressure space 31 of the pneumatic drive cylinder 28. The pressure ($P_A$) is in monotonic relation to the pivot angle ($\phi$), through which the brake pedal 16 is pivoted about is pivot axis 32 during actuation, and therefore also to the resulting essentially axial displacement (S) of a pedal tappet 33, by which the brake pedal 16 engages with its predetermined pedal transmission ratio $I_P$ centrally on the large-surface drive piston 34 of the pneumatic drive cylinder 28 via a reaction element, for example a rubber disc. That is the pressure $P_A$ increases with an increasing pivot angle $\phi$ or displacement travel S of the pedal tappet. 33.

The piston 34 of the pneumatic drive cylinder 28 forms, together with a roll diaphragm, the pressure-tight axially movable delimitation of the drive-pressure space 31 relative to a low-pressure chamber 36 of the pneumatic drive cylinder 28 of the brake booster 17. The low-pressure chamber 36 is in constant communication with the intake stub of the vehicle engine (not shown) and is, therefore, during the operation of the vehicle, kept at a low pressure, the absolute value of which is approximately 0.2 bar. The piston 34 of the drive cylinder 28 of the brake booster 17 directly engages, via a plunger rod 37 extending along the common central longitudinal axis 38 of the tandem master cylinder and of the drive cylinder 28 of the brake booster 17, on the primary piston, designated generally by numeral 39, of the tandem master cylinder 18, so that the force ($F_{PR}$) acting on the primary piston 39 during an actuation of the brake pedal 16 is equal to the sum of the forces $F_P$ and $F_K$ which result, on the one hand, from the actuation of the brake pedal 16 and, on the other hand, from the pressure loading of the drive-pressure space 31 of the pneumatic drive cylinder 28 of the brake booster 17, $F_P$ denoting the force which results from the actuation of the brake pedal 16 and which is given by the relation $$F_P = I_P \cdot f_P \qquad (1)$$

in which $I_p$ denotes the pedal transmission ratio and $f_p$ the force with which the driver actuates the brake pedal 16. $F_k$ denotes the force which is given by the relation $$F_k = A_k \cdot P_A \quad (2)$$

in which $A_K$ denotes the effective surface of the diaphragm and of the drive piston 34 which is exposed to the pressure $P_A$ which is fed into the drive-pressure space 31 and which is itself adjustable by a brake valve 41 which is provided as an operating element of the control part 29 and can be actuated by the brake pedal 16 and which is constructed as a proportional valve, so that the pressure $P_A$ is proportional to the actuating force $f_p$.

In the illustrated embodiment, the brake valve 41 is diagrammatically represented according to its function as a ⅔-way valve which has, as the basic position 0, a first throughflow position, in which the drive-pressure space 31 is connected, via the brake valve 41 and via a flow path 43 opened in the basic position 0 of an operating-mode control valve 42, to the low-pressure chamber 36 of the pneumatic drive cylinder 28 or to the intake stub of the vehicle engine, so that the same low pressure also prevails in the drive-pressure space 31 of the drive cylinder 28 as in the low-pressure chamber 36. Linked to these functional positions of the brake valve 41 and of the operating-mode control valve 42 are the basic position, corresponding to the non-actuated state of the brake system 10, of the primary piston 39 and of the secondary piston 45 of the tandem master cylinder 18 and the basic position, corresponding to a minimum volume of the drive-pressure space 31 of the pneumatic drive cylinder 28, of its large-surface drive piston 34.

When actuated, the brake valve 41 passes out of its basic position first into a shut-off position I, in which the drive-pressure space 31 is shut off relative to the low-pressure chamber 36 of the pneumatic cylinder 28, and, through this shut-off position I, into the functional position II, in which, via a throughflow path 44 of the brake valve 41 being openable in this functional position II, a pressure ($P_A$) derived from the atmospheric ambient pressure and variable in a metered manner between the pressure prevailing in the low-pressure chamber 36 and the atmospheric ambient pressure can be fed into the drive-pressure space 31 of the brake booster 17.

The operating-mode control valve 42 is constructed as a ³⁄₂-way solenoid valve which has a basic position 0 assigned to the normal (i.e., driver-controlled braking mode) and an energized position I, in which the pressure-medium conduit 46 leading from the operating-mode control valve 42 is under the atmospheric ambient pressure and is shut off relative to the intake stub of the vehicle engine or the low-pressure chamber 36 of the brake booster 17. The operating-mode control valve 42 is assigned to the automatically controlled braking phases which either can be initiated without the cooperation of the driver or can also be superposed on driver-controlled braking.

So that, in the second-mentioned instance of the automatically controlled pressure loading of the drive-pressure space 31 of the pneumatic drive cylinder 28 superposed on a normal braking actuation, the ambient pressure can be fed into the drive-pressure space 31 of the pneumatic drive cylinder 28 via the operating-mode control valve 42, a non-return valve 48 is inserted between the pressure-medium conduit 46 connecting the operating-mode control valve 42 to the brake valve 41 and the connection piece 47 of the drive-pressure space 31. The non-return valve 48 is constructed, for example, as a flutter valve and is controlled into its open position by relatively higher pressure in the pressure-medium conduit 46 than in the drive-pressure space 31 of the pneumatic drive cylinder 28 and shuts off by way of relatively higher pressure at the connection piece 47 of the drive-pressure space 31 than in the pressure-medium conduit 46. This non-return valve 48 is configured so that the restoring force of a restoring element urging the valve body of the non-return valve 48 into its closing position is very low and is equivalent to a "closing" pressure of at most 0.1 bar.

Figure 2:
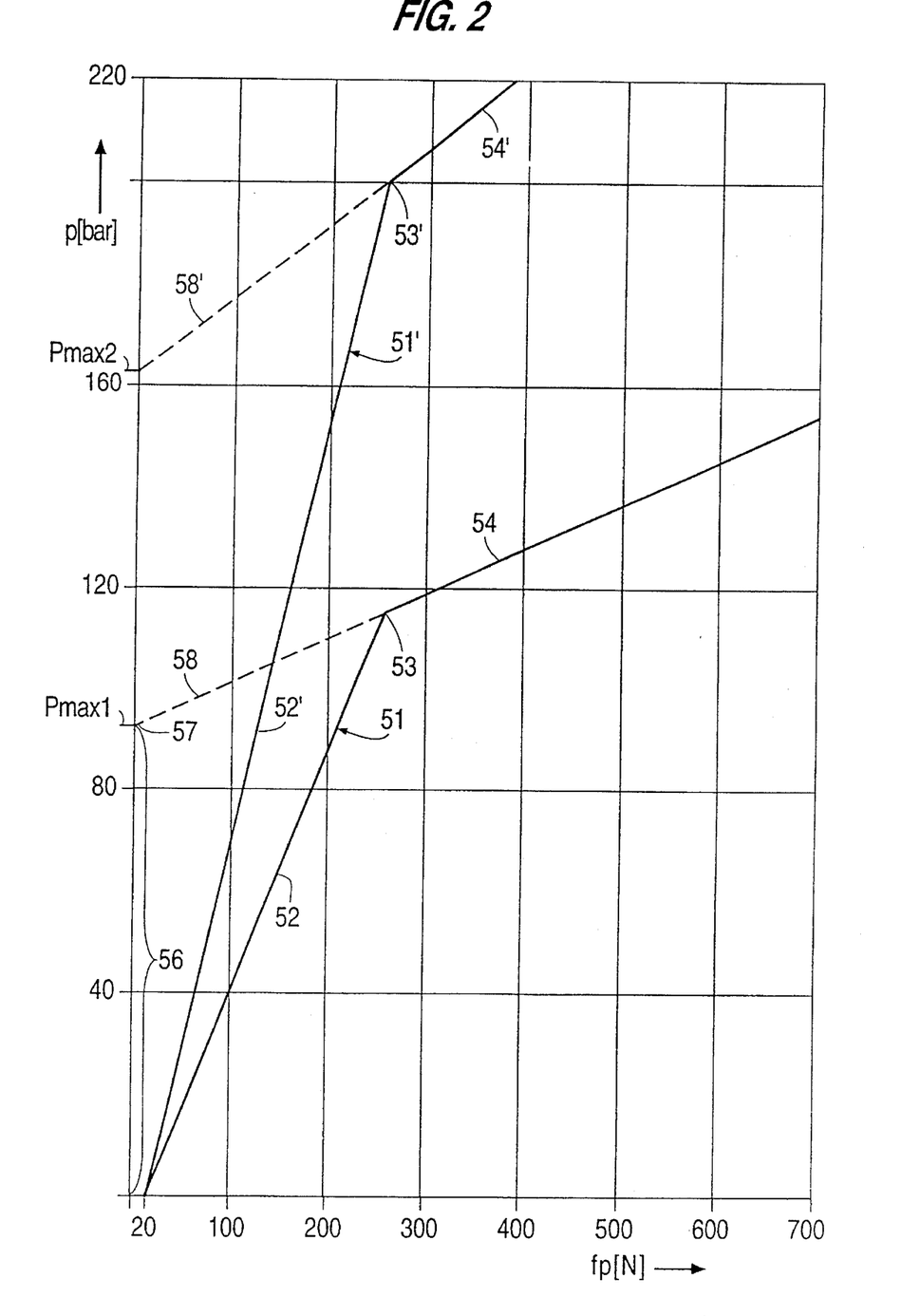
FIG. 2 is a brake-pressure/pedal-force characteristic diagram for explaining the operation of the brake system according to FIG. 1.

To explain the functioning of the brake-pressure control unit described thus far in terms of construction and for an additional explanation of further constructional details of its brake booster 17 and of its tandem master cylinder 18, reference will now also be made to FIG. 2. Numeral 51 denotes, as a whole, a typical brake-pressure/pedal-force characteristic of a tandem master cylinder of conventional configuration actuable via a pneumatic booster 17. The configuration is such that the brake-fluid volumes displaceable out of the primary outlet-pressure space 26 and the secondary outlet-pressure space 27 during actuation of the tandem master cylinder 18 are sufficient to achieve, in the front-wheel brakes 11, 12 and rear-wheel brakes 13, 14, the brake pressures which are indicated as ordinate values and which, according to the characteristic 51, are correlated with the pedal forces indicated as abscissa values.

The steeply rising branch 52 of the brake-pressure/pedal-force characteristic 51, commencing at a preliminary force of approximately 20 N represents that operating range of the brake-pressure control unit 17, 18, in which that fraction, generated by the brake booster 17, of the actuating force acting on the primary piston 39 also increases in proportion to the pedal force $f_p$, until, at the cut-off point 53, the pressure difference ΔP, useful for brake boosting, between the atmospheric ambient pressure and the markedly lower pressure of approximately 0.2 bar absolute pressure prevailing at the intake stub of the vehicle engine is exhausted. Therefore, the pressure in the drive-pressure space 31 of the brake booster 17 can no longer be increased further.

For example, a brake pressure of approximately 115 bar and a pedal force exerted on the brake pedal 16 of approximately 260 N correspond to the cut-off point 53. If the pedal-actuating force $f_p$ is increased beyond this value, the generation of brake pressure, starting from the cut-off point 53 of the characteristic 51, follows its less steeply rising branch 54, of which the gradient delta P/delta $f_p$ is given by the relation $$\Delta P / \Delta f_p = I_p \cdot \eta_p / A_{pr} \quad (3)$$

in which $I_p$ denotes the pedal transmission ratio which, in the illustrated embodiment of FIGS. 1 and 1a, has a value around 4.3, $\eta_p$ denotes the pedal efficiency which has a typical value of 0.9, and $A_{pr}$ denotes the effective cross-sectional surface of the primary piston 39 of the tandem master cylinder.

It follows directly from this that, in a brake system with the configuration of the brake unit 17, 18 corresponding to the characteristic 51 of FIG. 2, solely by changing over the operating-mode control valve 42 into its functional position I and by the resulting loading of the drive-pressure space 31 of the drive cylinder 28 of the brake booster 17 with the atmospheric ambient pressure, makes possible a brake pressure of at most approximately 92 bar as illustrated by the ordinate segment 56, which extends between the origin of the coordinates and the intersection point 57, at which the ordinate-side prolongation 58, marked by broken lines, of the flatly rising branch 54 of the characteristic 51 intersects the ordinate.

Presupposing a conventional configuration of the wheel brakes allowing the utilization of brake pressures of up to 180 bar, however, a relatively low brake pressure of this kind is not sufficient for purposes of driving-dynamics control, in order to keep the vehicle wheels within an optimum slip range. In situations where the vehicle is driving on a bend, for example when the front wheel on the outside of the bend is highly loaded as a result of the dynamic wheel-load shift, the utilizability of substantially higher brake pressures of, for example, 160 bar is possible and, for the purposes of a sensitive control, even necessary.

Accordingly, in the brake system 10 according to FIGS. 1 and 1a, the tandem master cylinder 18 and the brake booster 17 are coordinated with one another such that, in the event of an automatic activation of the brake-pressure control unit 17, 18, by a ventilation of the drive-pressure space 31 of the brake booster 17, the pressure which can be built up in the primary outlet-pressure space 26 and in the secondary outlet-pressure space 27 of the tandem master cylinder 18 reaches the aforementioned high value of 160 bar.

For the relevant coordination of the brake booster 17 and the tandem master cylinder 18, the latter is "made smaller", as compared with a brake unit, the brake-pressure/pedal-force characteristic of which corresponds to the characteristic 51 of the graph of FIG. 2, with the dimensioning of the brake booster 17 of such a brake unit being maintained. That is, the diameter of the primary piston 39 of the tandem master cylinder is reduced relative to the conventional brake unit by a factor a expressed by the relation $$A = (P_{max1}/P_{max2})^{1/2} \quad (4)$$

in which $P_{max1}$ denotes the maximum value of the pressure which can be achieved in the case of a conventional coordination of the brake unit during an automatic activation of the latter, and $P_{max2}$ denotes the corresponding maximum value which, with a predetermined configuration of the brake booster 17 corresponding to the conventional configuration, can be achieved in the master cylinder 18 with a reduced cross-section of its primary piston 39.

According to this configuration, a characteristic is obtained for the brake-pressure control unit 17, 18, with the primary piston 39 configured according to the relation (4) above, which is designated generally by numeral 51' in FIG. 2 and of which the steeply rising branch 52' and the less steeply rising branch 54', joining the more steeply rising branch 52', at the cut-off point 53', in each case extend more steeply than the corresponding branches 52 and 54 of the characteristic 51 of the brake unit used for a comparison. The brake-pressure value obtainable during a normal driver-controlled braking at the cut-off point 53' of the brake booster 17 is also increased in the ratio of the pressures $P_{max2}/P_{max1}$.

The effective cross-sectional surface ($A_{pr}$) of the primary piston 39 is the same amount as the effective cross-sectional surface ($A_{sk}$) of the secondary piston 45 delimiting the primary outlet-pressure space 26 of the tandem master cylinder 18 movably in a pressure-tight manner relative to its secondary outlet-pressure space 27. The maximum displacement travel ($S_{skmax}$) which the secondary piston 45 can execute with the effect of displacing brake fluid out of the secondary outlet-pressure space 27 connected with the rear-axle brake circuit II of the brake system 10 is sufficiently large to ensure that the brake-fluid quantity displaceable thereby suffices makes possible the utilization in the rear-wheel brakes a brake pressure corresponding to the generally "steeper" characteristic 51' of FIG. 2.

In a typical configuration of the rear-wheel brakes for a road vehicle of medium weight, the maximum volumetric capacity of the rear-axle brake circuit required for this purpose is approximately 4 cm³, which, in the case of a typical cross-sectional surface ($A_{sk}$) of the secondary 45 of 2.5 cm², corresponds to a maximum displacement travel ($S_{skmax}$) of the secondary piston 45 of 16 mm.

In a typical form, the brake unit 17, 18 is configured so that, with a pedal transmission ratio $I_p$ of 4.3, a pedal travel of approximately 13 cm can be utilized. This corresponds to a maximum total stroke ($S_{Gpr}$) of the primary piston 39, on which the brake pedal 16 is "directly" supported axially via its pedal tappet 33 and the plunger rod 37 of the booster piston 34, of approximately 30 mm. Of this maximum total stroke ($S_{Gpr}$), to which a total stroke volume of 7.5 cm³ corresponds, only 14 mm, corresponding to a displacement volume of 3.5 cm³ in the illustrative example chosen, can be utilized for a brake-pressure build-up in the front-axle brake circuit connected to the primary outlet-pressure space of the tandem master cylinder 18, because 4 cm³ of this total stroke volume of the primary piston 39 are, as it were, consumed for the brake-pressure build-up in the rear-axle brake circuit II.

In a conventional vehicle brake system in which the front-wheel brakes 11, 12 and the rear-wheel brakes 13, 14 are loaded at the same pressure level, the brake-fluid volumetric capacity of the front-wheel brakes 11, 12, in the case of the maximum possible brake pressures of around 200 bar, corresponds approximately to 2.5 times the value of the volumetric capacity of the rear-wheel brakes 13, 14, thus a value of approximately 10 cm³ in the above example. This corresponds, in turn, to a residual requirement of 6.5 cm³ which has to be fed into the front-axle brake circuit I in addition to the brake-fluid volume of only 3.5 cm³ displaceable into the front-axle brake circuit by means of the tandem master cylinder 18.

For the relevant feed, an auxiliary cylinder designated generally by numeral 59, is provided so that, in addition to the brake-fluid quantity displaceable out of the primary outlet-pressure space 26 of the master cylinder 18 into the front-axle brake circuit I, brake fluid can be displaced at a controllable pressure level into the front-axle brake circuit I in a sufficient quantity.

In the illustrated embodiment, the auxiliary cylinder 59 is constructed as a pressure intensifier with the outlet-pressure space 62, delimited axially movably on one side and in a pressure-tight manner by a displacement piston designated generally by numeral 61, connected to the supply connection 63, assigned to the front-axle brake circuit I, of the hydraulic unit designated generally by numeral 64, of the anti-lock system. The supply connection 63 is also connected directly to the primary pressure outlet 23 of the tandem master cylinder 18 by, for example, being effected by a pressure conduit 66 connecting the primary pressure outlet 23 of the master cylinder 18 to the outlet-pressure space 62 of the auxiliary cylinder 59.

The displacement piston 61 is urged by a restoring spring 67 (dashed lines) into its basic position corresponding to the maximum volume of the outlet-pressure space 62 and marked by an abutment effect with the housing 68 of the auxiliary cylinder 59, and is displaceable with the effect of a volume reduction of the outlet-pressure space 62 by the valve-controlled loading of a drive-pressure space 69 with the outlet pressure of a hydraulic pressure source 94 (schematically shown), with which the vehicle is already equipped, for example the hydraulic pump of a power-assisted steering or the pressure-supply pump of a hydraulic level control. The maximum stroke ($S_H$) which the displacement piston 61 can execute and its effective cross-sectional surface ($A_H$) are coordinated with one another so that the stroke volume $A_H \cdot S_{HG}$ corresponds at least to that brake-fluid volume which, in addition to the brake-fluid volume displaceable out of the primary outlet-pressure space 26 of the tandem master cylinder 18 into the front-axle brake circuit I, has to be displaced thereinto, in order, with the desired short brake-pedal travel, to achieve a maximum possible vehicle deceleration.

A second bore stage 73 adjoins the bore stage 71 of the cylinder housing 68, in which the displacement piston 61 is guided displaceably in a pressure-tight manner via a radial housing shoulder 72. In the second bore stage 73, which is larger in diameter, as seen along the central longitudinal axis 74, a drive piston 76 is displaceably arranged in a pressure-tight manner, coaxially with the displacement piston 61, and forms the axially movable limitation of the drive-pressure space 69 of the auxiliary cylinder 59. The drive piston 76 is supported axially on the displacement piston 61 via an axial tappet 77. On its side facing away from the displacement piston 61, the drive piston 76 is provided with a short axial stop tappet 78, which, in the illustrated basic position of the piston arrangement 61, 76, is supported on a housing cover 79 of the auxiliary-cylinder housing 68. The housing cover 79 forms the axial limitation of the drive-pressure space 69 fixed relative to the housing.

At an axial distance from the piston flange 81 of the displacement piston 61, the piston flange 81 movable in a pressure-tight manner, and forming the axial limitation, of the outlet-pressure space 62 of the auxiliary cylinder 59, the displacement piston 61 is provided with a second piston flange 82 arranged within the bore stage 71 of smaller diameter and sealed off displaceably relative to the latter. The two piston flanges 81, 82, which are connected to one another in one piece by a piston rod 83, form the axial limitation of an annular collecting space 84 for brake fluid which can overflow out of the outlet-pressure space into this collecting space 84 as a negligibly small, but in practice unavoidable leakage flow and can flow off via a return conduit (not shown) to the brake-fluid reservoir 86 of the tandem master cylinder 18.

The axial distance between the two piston flanges 81, 82 is slightly larger than the maximum stroke ($S_H$) which the displacement piston 61 can execute. The arrangement of the flow-off orifice 87 of the collecting space 84 is such that, in the possible end positions of the displacement piston 61, the flow-off orifice 87 is always arranged between the two piston flanges 81, 82. A corresponding flow-off orifice 88 is also provided in that part of the auxiliary-cylinder housing 68 which forms the radially outer limitation of a second annular collecting space 89 and which extends between the drive piston 76 and the radial housing shoulder 72. The axial distance of the shoulder 72 from the drive piston 76, as seen in the basic position of the latter, is again somewhat larger than the maximum piston stroke ($S_H$) of the displacement piston 61 and of the drive piston 76.

The flow-off orifice 88 of the second collecting space 89, into which pressure medium of the auxiliary pressure source can seep from the drive-pressure space 69 of the auxiliary cylinder 59, extends from an annular groove 91, directly adjoining the radial shoulder 72 of the housing 68, of the cylinder housing 68 and is open towards the ambient atmosphere. This arrangement of the auxiliary cylinder 59 guarantees a sufficiently good media separation between the brake-pressure supply circuit, operated with brake fluid, of the auxiliary cylinder 59 and the drive circuit, operated, for example, with mineral oil, of the auxiliary cylinder 59.

For the operational control of the auxiliary cylinder 59, a pressure build-up control valve 92, is provided, in the illustrated embodiment, for connecting and shutting off selectively the pressure outlet 93 of the auxiliary pressure source 94 to a control-pressure inlet 96 of the drive-pressure space 69 of the auxiliary cylinder 59. Also, a pressure-reduction control valve 97 is provided for connecting and shutting off selectively the control-pressure inlet 96 to the pressureless tank connection 98 of the auxiliary pressure source.

The pressure build-up control valve 92 and the pressure-reduction control valve 97 are constructed as ⅔-way solenoid valves which can be triggered by output signals from the electronic control unit 22. The basic position 0 of the pressure-reduction control valve 97 assumed in the currentless state of its control magnet 99 is its throughflow position, and the functional position I assumed in the energized state of its control magnet 99 is its shut-off position. The pressure build-up control valve 92 shuts off in the currentless state of its control magnet 99 and assumes its throughflow position I when the control magnet 99 is energized.

An electronic or electromechanical pressure sensor 102 is connected to the pressure-supply connection 63 of the ABS hydraulic unit 64, which is assigned to the front-axle brake circuit I and to which the pressure outlet 101 of the auxiliary cylinder and also the pressure outlet 23, assigned to the front-axle brake circuit I, of the tandem master cylinder 18 of the brake-pressure control unit 17, 18 are connected. The sensor 102 generates an electrical output signal which is characteristic of the pressure fed into the front-axle brake circuit and is delivered as a data input signal to the electronic control unit 22.

Normal braking is controlled by the driver with a view to generating brake pressure and not subjected to any other control. In such braking, the hydraulic unit 64 of the anti-lock (ABS) system merely performs the transfer of the outlet pressure, fed in at its pressure-supply connection 63, of the pressure present at the primary pressure outlet 23 of the tandem master cylinder 18 or at the pressure outlet 101 of the auxiliary cylinder 59 to the front-wheel brakes 11, 12 and the transfer of the outlet pressure which is provided at the secondary pressure outlet 24 of the master cylinder 18 and which is fed into the ABS hydraulic unit 64 at the pressure-supply connection 103 of the latter assigned to the rear-axle brake circuit II.

The brake system 10 explained thus far in terms of its construction works, on the rear-axle brake circuit II, in the same way as a conventional brake system, in which a brake-pressure build-up on the rear-wheel brakes 13, 14 takes place solely as a result of the displacement of brake fluid out of the secondary outlet-pressure space of the tandem master cylinder 18 of the brake-pressure control unit 17, 18.

On the front-wheel brakes 11, 12, the brake-pressure build-up takes place as a result of a simultaneous displacement of brake fluid out of the primary outlet-pressure space 26 of the master cylinder 18 and out of the outlet-pressure space 62 of the auxiliary cylinder 59. The cooperation of the latter during the brake-pressure buildup in the front-axle brake circuit I takes place with the effect of a follow-up control, in which the desired value of the brake pressure is predetermined by the actuation of the brake pedal 16.

The generation of an electrical signal characteristic of the brake-pressure desired value and processable by the electronic control unit 22 takes place by the pedal-position sensor 21. The actual value of the brake pressure prevailing in the front-axle brake circuit I is recorded by the pressure sensor 102, and the matching of the brake pressure actual value to its desired value is achieved in that the electronic control unit 22, from a comparison of the desired-value output signals of the pedal-position sensor 21 with the actual-value output signals of the pressure sensor 102, generates trigger signals for the brake-pressure build-up and reduction control valves 92, 97. By way of these signals, the valves are alternately switched or changed over into their functional positions I and 0 suitable for a rapid matching of the brake-pressure actual value to its desired value.

By predetermining different pedal-position/brake-pressure correlations, the brake system 10 can be adjusted to correspondingly different pedal-travel/brake-pressure characteristics. In principle, the pedal-travel/brake-pressure correlation can be selected so that, assuming identical cross-sections of the primary piston 39 and of the secondary piston 45 of the tandem master cylinder 18, the stroke of the primary piston 39 necessary for controlling the brake system to maximum brake pressure is smaller than that of the secondary piston 45.

If the pressure conduit 66 directly connecting the primary pressure outlet 23 of the master cylinder 18 to a pressure inlet 104 of the auxiliary cylinder 59 or to the pressure-supply connection 63 of the ABS hydraulic unit 64 can be shut off by an outlet control valve 106 (shown in dash lines), then influence can thereby too be exerted on the pedal-travel/brake-pressure characteristic since, from the moment of change-over of the outlet control valve 106, which is configured as a 2/2-way solenoid valve with a currentlessly open basic position 0 and a shut-off switching position I, the pedal travel is determined essentially solely by the volumetric capacity of the rear-axle brake circuit II.

In the shut-off switching position I of the outlet control valve 106 in the case of a pulsed triggering of the pressure build-up control valve 92 and of the pressure-reduction control valve 97, pressure changes in the outlet-pressure space 62 of the auxiliary cylinder 59, likewise take place in a pulsating manner and are also prevented from leading to correspondingly pulsating changes in the reaction forces detectable on the brake pedal 16 which otherwise could give an uncomfortable feeling particularly in the case of high pressure-rise or pressure-reduction rates.

The outlet control valve 106 can also be utilized for changing over the brake system 10 to different values of the front-axle/rear-axle brake-force distribution because, after the change-over of the outlet control valve into its shut-off position I, the front-axle brake pressure can be controlled, as it were, independently of the rear-axle brake pressure by the auxiliary cylinder 59. A very good approximation to the ideal brake-force distribution corresponding to an identical adhesion utilization on the front and the rear wheels of the vehicle is thereby achievable. To that extent, by utilizing the outlet control valve 106, which can also be switched into its shut-off position I as early as at the start of a braking operation, in combination with an expedient triggering of the auxiliary cylinder 59, an electronic control of the brake-force distribution within the entire braking range (EBKV function) can also be implemented.

The anti-lock control working on the recirculation principle can be superposed on the brake-pressure control operations explained thus far, and a brake-pressure reduction phase required on the two front-wheel brakes 11, 12 can be assisted by a brake-pressure reduction operation of the auxiliary cylinder 59.

In the brake system 10, automatically controlled braking operations, which are necessary for the purpose of driving-dynamics control or for the purpose of traction control, can be achieved as follows.

1. Activation of an individual wheel brake of the front-axle brake circuit I, for example the left front-wheel brake 11.

For this activation in brake circuit I, the inlet valves 112, 113 and 114 of those wheel brakes 12, 13 and 14 which are not to be braked are changed over into their shut-off position I, while only the inlet valve 111 assigned to the wheel brake 11 to be activated remains in its open basic position 0. The brake-pressure build-up takes place by changing over the operating-mode control valve 42 into its switching position I. Consequently, the brake booster 17 of the brake-pressure control unit 17, 18 is loaded in its drive-pressure space 31 witch the atmospheric ambient pressure and is thereby activated.

Simultaneously therewith, or with a slight delay relative thereto, the pressure build-up control valve 92 is changed over into its throughflow position I and the pressure-reduction control valve 97 into its shut-off position I. As a result, the outlet pressure of the auxiliary pressure source 94 is fed into the drive-pressure space 69 of the auxiliary cylinder 59 which is thereby controlled in its brake-pressure build-up mode. The build-up rate in time of the brake pressure established in the main brake conduit 107 of the front-axle brake circuit I and recorded by the pressure sensor 102 can be controlled in that, on one hand, the operating-mode control valve 42, controlled by output signals from the electronic control unit 22, is changed over in a pulsed manner between its functional positions I and 0.

Furthermore, the pressure build-up control valve 92 is changed over in a pulsed manner between its throughflow position I and its shut-off basic position 0, and additionally also the pressure-reduction control valve 97 is changed over between its shut-off switching position I and its open basic position 0. As a result of these triggerings of the valves 42, 92 and 97 by the electronic control unit 22, the brake-pressure build-up rate ($dP_{VL/dt}$) can be adjusted within a wide variation range. The rate of rise ($dP_{VL/dt}$) of the brake pressure ($P_{VL}$) in the left front-wheel brake 11 can be controlled by a pulsed triggering of the inlet valve 111 of this wheel brake 11.

By utilizing the output signals from the wheel-speed sensors 133, the metering of the brake pressure in the wheel brake 11 can be controlled so that a desired wheel slip of the braked front wheel is achieved and is maintained for a requisite timespan. A relevant requisite situation for driving-dynamics control can, for example, be the negotiation of a right-hand bend with high traction, and by way of the build-up of a wheel slip on the highly loaded left front wheel, its lateral guiding force is somewhat reduced and a stabilization of tile vehicle against oversteering can thereby be achieved.

The re-reduction of the brake pressure in the course of an automatically controlled braking operation takes place by relieving the drive-pressure space 69 of the auxiliary cylinder 59 of pressure via the pressure-reduction control valve 97 and by changing over the operating-mode control valve 42 of the brake booster 17 into its basic position 0. Analogously to the adjustment of a specific brake-pressure build-up rate, the brake-pressure reduction rate can, in turn, be controlled by a pulsed triggering of the valves.

If the secondary pressure outlet 23 of the tandem master cylinder 18 can be shut off relative to the outlet-pressure space 62 of the auxiliary cylinder 59, then, at the latest after an introductory phase of the automatically controlled brake activation, the auxiliary cylinder 59 can be shut off relative to the master cylinder 18 by changing over the outlet control valve 106 and the further generation of pressure in the main brake conduit 107 of the front-axle brake circuit I can be controlled solely by triggering the pressure build-up control valve 92 and the pressure-reduction control valve 97.

An automatic activation of the two front-wheel brakes 11, 12 by brake pressures which, if necessary, are different can be achieved entirely analogously to the activation of a single wheel brake of the front-axle brake circuit I.

2. Automatic activation of a rear-wheel brake:

The selection of the wheel brake to be activated, for example, the wheel brake 14 of the right driven rear wheel, and the metering of the brake pressure to be fed thereinto by the inlet valves 113, 114 takes place in the same way as in the front-axle brake circuit I. As a pressure ($P_{HA}$) which is fed into the main brake conduit 108 of the rear-axle brake circuit II, the pressure which is provided at the secondary pressure outlet 24 of the tandem master cylinder 18 and which is generated in the secondary-outlet pressure space 27 of the tandem master cylinder 18 is utilized by an automatic triggering of the brake booster 17. With the inflow control valve 141 closed, this pressure can be fed into the main brake conduit 108 via the change-over valve 138 located in its basic position 0.

A further way of feeding pressure into the main brake conduit 108 of the rear-axle brake circuit II is to shut off the main brake conduit 108 relative to the secondary pressure outlet 24 of the master cylinder 18 by triggering the change-over valve 138 into its switching position I, to actuate the master cylinder 18 by triggering the operating-mode control valve 42 of its brake booster 17, to activate the recirculating pump 127 of the rear-axle brake circuit II and to supply to its low-pressure inlet 136, via the inflow control valve 141 changed over into its throughflow position I, the brake fluid which is displaced out of the secondary outlet-pressure space 27 of the tandem master cylinder 18 and which is displaced by the recirculating pump 127 into the main brake conduit 108 in order to build up pressure in the main brake conduit 108 of the rear-axle brake circuit II. In this operating mode in which the recirculating pump 127 can be used as a brake-pressure source, the tandem master cylinder 18 is used, so to speak, as a precharging-pressure source for supplying brake fluid to the recirculating pump 127. In this brake-pressure build-up mode, a maximum possible rate of pressure rise ($dP_{HA/dt}$) can be achieved in the main brake conduit 108 because, if the outlet pressure provided at the secondary pressure outlet 24 of the tandem master cylinder 18 as a result of the automatically controlled activation of the latter rises more rapidly than the outlet pressure of the recirculating pump 127, the master-cylinder outlet pressure can likewise be fed into the main brake conduit 108 via a non-return valve 142 which is connected parallel to the change-over valve 138. As a result of a relatively higher pressure at the secondary pressure outlet 24 than in the main brake conduit 108, the non-return valve 142 is loaded in the opening direction and otherwise shuts off.

In the event that the recirculating pump 127 is constructed as a self-priming pump and a gradient present between the brake-fluid reservoir 86 and the low-pressure connection 136 of the recirculating pump 127 is sufficient for the operation of filling the pump chamber of the recirculating pump 127, an automatic triggering of the brake booster 17 of the tandem master cylinder 18 is not necessary in order to execute automatically controlled braking on the rear-axle brake circuit II. Even if a pressure sensor 143 (shown in dash lines in FIG. 1) is provided for the rear-axle brake circuit II to generate electrical output signals which are characteristic of the pressure in the main brake conduit 108 of the rear-axle brake circuit II and which are delivered as input signals to the electronic control unit 22, then it is also possible in normal driver-controlled braking to utilize the recirculating pump 127 of the rear-axle brake circuit II as a brake-pressure source and to control the brake pressure in the rear-axle brake circuit II in the manner of a follow-up control. The adjustment of pressure can be carried out by regulating the rotational speed of the recirculating pump 127 and/or by a pulsed change-over of the inflow control valve 141 of the brake system 10, by way of which the supply of brake fluid conveyable by the recirculating pump 127 into the main brake conduit 108 of the rear-axle brake circuit II can be adjusted.

To explain a further embodiment of a brake system 10' functionally analogous to the brake system 10 according to FIG. 1, reference will now be made to FIG. 3. Insofar as elements of the brake systems 10 and 10' bear the same reference symbols, this is to treat as an indication of the constructional and functional identity and/or analogy of the identically designated functional elements and also a reference to the description of these given on the basis of the brake system 10 according to FIG. 1, so that the explanation of the brake system 10' according to FIG. 3 can be restricted essentially to its differences from the brake system 10 according to FIG. 1.

Figure 3:
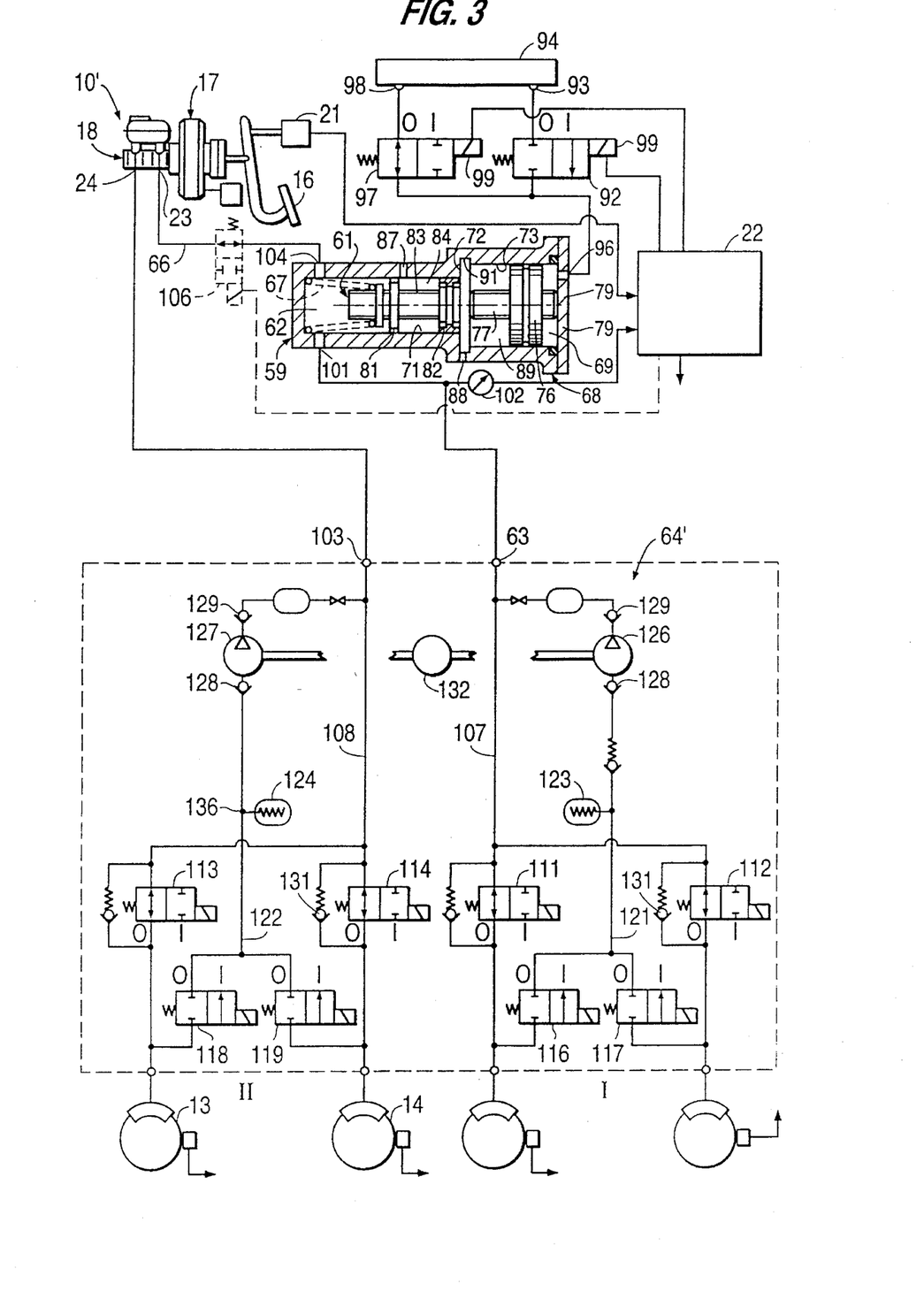
FIG. 3 is a schematic diagram of another embodiment of a dual-circuit brake system according to the present invention.

In terms of the design of the front-axle brake circuit I and its pressure supply, the brake system 10' according to FIG. 3 is produced in the same way as the brake system 10 according to FIG. 1. The secondary pressure outlet 24 of the tandem master cylinder 18 is, however, connected directly to the pressure-supply connection 103 which is assigned to the rear-axle brake circuit II and belongs to the ABS hydraulic unit 64' and from which the main brake conduit 108 of the rear-axle brake circuit II extends. Furthermore, the low-pressure connection 136 of the recirculating pump 127 of the rear-axle brake circuit II is connected directly to its return conduit 122, i.e. without a non-return valve being interposed. The hydraulic unit 64' of the brake system 10' therefore corresponds to that of a currently standard 4-channel anti-lock system.

During an automatically controlled braking operation of one or both wheel brakes 13 and/or 14 of the rear-axle brake circuit II, the pressure which can be fed into the main brake conduit 108 is provided solely as a result of the automatic activation of the brake-pressure control unit 17, 18. With the exception of an electronically regulatable brake-force distribution, the same functions can be performed with the brake system 10' as with the brake system 10 according to FIG. 1.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A hydraulic dual-circuit brake system for a road vehicle having an anti-lock system (ABS) operational on a recirculation principle and a device for driving-dynamics control (DDC) operational on a principle of keeping longitudinal and lateral vehicle wheel slip within limits compatible overall with dynamic stability of the road vehicle by an automatic electronically controlled activation of at least one wheel brake, and a device for automatically initiating full braking when a vehicle driver actuates a brake pedal at a speed higher than a relevant threshold value, comprising (a) brake-circuit division comprising front axle and rear axle brake circuits and, a brake-pressure control unit including a static master cylinder operatively arranged to be actuable by the brake pedal via a brake booster and having pressure outlets assigned individually to front and rear brake circuits;

(b) brake-pressure regulating valves of the anti-lock system operable to be selectively triggered for selection of at least one wheel brake to be activated in the driving-dynamics control mode;

(c) a pedal-position sensor configured to generate electrical output signals characteristic of an instantaneous position of the brake pedal;

(d) an electronic control unit for processing said signals to control at least one of anti-lock mode and driving-dynamics control mode as desired-value data for vehicle deceleration desired by the vehicle driver, and (e) a pressure sensor operable to generate electrical output signals characteristic of instantaneous values of the brake pressure fed into the front-axle brake circuit and processable by the electronic control unit as brake-pressure actual-value information signals, wherein (f) the brake-pressure control unit configured to be controllable into a brake-pressure supply mode both by pedal-controlled pressure loading of a drive-pressure space of the associated brake booster and by valve-controlled pressure loading of the drive-pressure space of the brake booster, said valve-controlled pressure loading being initiatable automatically by output signals from the electronic control unit;

(g) an auxiliary cylinder provided for one of a supplementary and sole supply of brake pressure to the front-axle brake circuit of the brake system so as, by way of valve control, selectively loadable with and relieved of outlet pressure of an auxiliary pressure source and via which, both during normal driver-controlled partial or full braking and during automatically controlled partial or full braking, a brake quantity fluid is displaceable into the brake circuit connected to the primary pressure outlet of the brake-pressure control unit, the auxiliary cylinder constituting a pressure intensifier whose maximum outlet-pressure level is sufficiently high for utilization of high adhesion coefficients in the driving-dynamics control mode; and (h) the brake-fluid quantity displaceable into the front-axle brake circuit is controllable in a predeterminable monotonic correlation from a comparative processing of output signals of the pedal-position sensor with output signals of the pressure sensor.

2. The brake system according to claim 1, wherein the brake-fluid quantity displaceable into the front-axle brake circuit is between about ⅓ and ¾ of a quantity displaced into the wheel brakes for maximum adhesion coefficients to obtain a front wheel locking limit.

3. The brake system according to claim 1, wherein the brake-fluid quantity displaceable as a result of the actuation of the brake-pressure control unit out of a primary outlet-pressure space of the latter is smaller than the brake-fluid quantity displaceable into the front-axle brake circuit.

4. The brake system according to claim 3, wherein the brake-fluid quantity displaceable into the front-axle brake circuit is between about ⅓ and ¾ of that quantity which has to be displaced into the wheel brakes for maximum adhesion coefficients to obtain a front wheel locking limit.

5. The brake system according to claim 1, wherein, in an automatically controlled activation of at least one of the rear-wheel brakes, the latter are arranged to be loaded directly with the outlet pressure provided at the secondary pressure outlet of the master cylinder upon triggering the brake booster.

6. The brake system according to claim 1, wherein (i) a change-over valve constituting a solenoid valve is operatively arranged such that, upon energization of an associated control magnet thereof by an output signal from the electronic control unit, the change-over valve is changed over from a currentlessly open basic position in which the secondary pressure outlet of the master cylinder is connected to the main brake conduit of the rear-axle brake circuit, into a shut-off switching position;

(j) a supply control valve constituting a solenoid valve is operatively arranged such that, upon energization of an associated control magnet thereof by an output signal from the electronic control unit, the supply control valve is changed over from a currentlessly shut-off basic position, in which the secondary pressure outlet of the master cylinder is shut off relative to the low-pressure connection of the recirculating pump of the rear-axle brake circuit, into a switching position connecting the low-pressure connection of the recirculating pump to the secondary pressure outlet of the master cylinder, (k) the low-pressure connection of the recirculating pump of the rear-axle brake circuit is connected to its return conduit via which, in pressure-reduction phases of the anti-lock control, brake fluid discharged from one or more of the wheel brakes undergoing the control into a low-pressure accumulator flows via a non-return valve which, by relatively higher pressure in the return conduit than at the low-pressure connection of the recirculating pump, is loaded in the opening direction and, by way of a relatively higher pressure at a low-pressure connection thereof than in the return conduit and by a valve spring, is urged into its shut-off position, and (l) in the event of an automatic activation of at least one of the wheel brakes of the rear-axle brake circuit, the recirculating pump is arranged to be operable as a brake-pressure source which conveys its brake fluid, delivered via the open supply control valve, into the main brake conduit of the rear-axle brake circuit, said main brake conduit being shut off relative to the master-cylinder pressure outlet.

7. The brake system according to claim 6, wherein a non-return valve is connected parallel to the change-over valve and is configured, with a relatively higher pressure at the secondary pressure outlet of the master cylinder than in the main brake conduit of the rear-axle brake circuit, so as to be loaded in the opening direction and is otherwise shut off.

8. The brake system according to claim 6, wherein the change-over valve, in a switching position thereof, is arranged to function as a pressure-limiting valve.

9. The brake system according to claim 8, wherein a non-return valve is connected parallel to the change-over valve and is configured, with a relatively higher pressure at the secondary pressure outlet of the master cylinder than in the main brake conduit of the rear-axle brake circuit, so as to be loaded in the opening direction and is otherwise shut off.

10. The brake system according to claim 6, wherein, with the supply control valve in a closed position, a pressure-reduction phase of a braking operation proceeding under automatic control on the rear-axle brake circuit takes place by recirculation of brake fluid by the recirculating pump via the change-over valve switched into the pressure-limiting position.

11. The brake system according to claim 1, wherein one of an electronic and electromechanical pressure sensor is operatively assigned to the rear-axle brake circuit and is configured to generate electrical output signals characteristic of the pressure prevailing in a main brake conduit of the rear-axle brake circuit and deliverable to the electronic control unit as pressure actual-value information signals.

12. The brake system according to claim 1, wherein an outlet control valve constituting a solenoid valve and configured to be changeable over from a basic position, in which the primary pressure outlet of the master cylinder is connected to the pressure-supply connection of the main brake conduit of the front-axle brake circuit, into a shut-off position.

13. The brake system according to claim 12, wherein the recirculating pump of the rear-axle brake circuit is a self-priming pump.

14. The brake system according to claim 1, wherein the auxiliary cylinder is a staged cylinder having a drive-piston stage of which, movably limiting the drive-pressure space in a pressure-tight manner, and the displacement-piston stage of which, movably limiting the outlet-pressure space, a preferably pressureless and/or ventilatable media separation space is defined.

15. The brake system according to claim 14, wherein a pressureless collecting space for brake fluid is arranged between the outlet-pressure space and the media separation space of the auxiliary cylinder and is delimited by piston flanges of the displacement piston axially spaced from one another.

16. The brake system according to claim 14, wherein a drag region, wettable with brake fluid, of the displacement-piston stage and a drag region, wettable with the pressure medium of the auxiliary-pressure source, of the drive-piston stage are offset relative to one another by at least one radial housing shoulder, over which only one of the two piston stages is able to travel, and the drag region of the other of the two piston stages terminates at a distance from the at least one radial housing shoulder.

17. The brake system according to claim 16, wherein the drag regions of the displacement-piston stage and of the drive-piston stage are offset relative to one another by an annular groove of the housing of the auxiliary cylinder.

18. The brake system according to claim 14, wherein the displacement-piston stage and the drive-piston stage of the auxiliary cylinder are separate piston elements supported axially on one another via at least one tappet-shaped piston extension of at least one of the drive-piston stage and the displacement-piston stage.

* * * * *